(12) United States Patent
Shet et al.

(10) Patent No.: US 11,604,802 B2
(45) Date of Patent: Mar. 14, 2023

(54) COMPUTER NETWORK CONTROLLED DATA ORCHESTRATION SYSTEM AND METHOD FOR DATA AGGREGATION, NORMALIZATION, FOR PRESENTATION, ANALYSIS AND ACTION/DECISION MAKING

(71) Applicant: Taascom, Inc., San Jose, CA (US)

(72) Inventors: Sanjiv Shrikant Shet, Bangalore (IN); Ranga Raj, Bangalore (IN); Teck Lee Low, Singapore (SG)

(73) Assignee: TAASCOM, INC., San Jose, CA (US)

(*) Notice: Subject to any disclaimer, the term of this patent is extended or adjusted under 35 U.S.C. 154(b) by 625 days.

(21) Appl. No.: 15/151,739

(22) Filed: May 11, 2016

(65) Prior Publication Data

US 2017/0011105 A1  Jan. 12, 2017

Related U.S. Application Data

(63) Continuation of application No. 14/797,091, filed on Jul. 11, 2015.

(51) Int. Cl.
*G06F 16/25* (2019.01)
*G06F 16/26* (2019.01)
(Continued)

(52) U.S. Cl.
CPC ............ *G06F 16/258* (2019.01); *G06F 16/25* (2019.01); *G06F 16/26* (2019.01); *G06F 16/284* (2019.01);
(Continued)

(58) Field of Classification Search
CPC ........ G06F 16/258; G06F 16/25; G06F 16/26; G06F 16/284; G06N 20/00; G06Q 10/00; G06Q 30/06
See application file for complete search history.

(56) References Cited

U.S. PATENT DOCUMENTS

| 7,467,353 B2 * | 12/2008 | Kurlander | H04L 67/06 715/744 |
| 8,825,515 B1 * | 9/2014 | Hanson | G06Q 50/01 705/7.32 |
| 2005/0183143 A1 * | 8/2005 | Anderholm | G06F 11/3438 726/22 |

(Continued)

FOREIGN PATENT DOCUMENTS

| WO | 2002035395 | 5/2002 |
| WO | 2015006044 | 1/2015 |

*Primary Examiner* — Cheyne D Ly
(74) *Attorney, Agent, or Firm* — Michael D. Eisenberg

(57) ABSTRACT

Embodiments disclosed include computer automated systems and methods for aggregating data from a plurality of data sources, such as proxy devices, legacy protocols, devices, applications, machines, sensors, things across locations and user types, or device clouds among devices and applications. The aggregated data is then normalized and the normalized data is analyzed. The analyzing is based on a correlated event or events, a correlated condition or conditions, and a correlated trend or trends across the plurality of data sources. And based on the analyzed data, relevant aggregated and normalized data is combined and displayed in a display compatible format. Additionally, user needs are determined based on the analyzed aggregated, normalized data. The user need comprises a need for an item or items comprising at least one of a service, a product, and an upgrade of hardware or software components. Further a provider from a plurality of providers is determined based on the determined user need, and finally a need fulfillment transaction between the user and the provider is initiated.

25 Claims, 4 Drawing Sheets

(51) Int. Cl.
*G06F 16/28* (2019.01)
*G06N 20/00* (2019.01)
*G06Q 30/06* (2012.01)
*G06Q 10/00* (2012.01)

(52) U.S. Cl.
CPC ............. *G06N 20/00* (2019.01); *G06Q 10/00* (2013.01); *G06Q 30/06* (2013.01)

(56) References Cited

U.S. PATENT DOCUMENTS

| | | |
|---|---|---|
| 2006/0052945 A1 | 3/2006 | Rabinowitz et al. |
| 2009/0070783 A1 | 3/2009 | Schmidt et al. |
| 2010/0114899 A1 | 5/2010 | Guha et al. |
| 2011/0055226 A1 | 3/2011 | Martino et al. |
| 2011/0225081 A1* | 9/2011 | Kittelsen ............... G06Q 40/04 705/37 |
| 2013/0191165 A1 | 7/2013 | MacDonald et al. |
| 2014/0006244 A1* | 1/2014 | Crowley ............... G06Q 40/04 705/37 |
| 2014/0181085 A1 | 6/2014 | Gokhale et al. |
| 2014/0200989 A1 | 7/2014 | Cohen Kassko et al. |
| 2014/0337429 A1 | 11/2014 | Asenjo et al. |
| 2014/0359008 A1* | 12/2014 | Finney ................... H04W 4/21 709/204 |
| 2015/0212126 A1* | 7/2015 | Harding ............. G01R 19/2513 707/756 |
| 2015/0348083 A1* | 12/2015 | Brill .................. G06Q 30/0222 705/14.23 |

\* cited by examiner

COMPUTER NETWORK CONTROLLED DATA ORCHESTRATION SYSTEM AND METHOD FOR DATA AGGREGATION, NORMALIZATION, FOR PRESENTATION, ANALYSIS AND ACTION/DECISION MAKING

CROSS REFERENCE TO RELATED APPLICATIONS

This application is a continuation application of U.S. application Ser. No. 14/797,091 filed on 11 Jul. 2015 entitled "COMPUTER NETWORK CONTROLLED DATA ORCHESTRATION SYSTEM AND METHOD FOR DATA AGGREGATION, NORMALIZATION, FOR PRESENTATION, ANALYSIS AND ACTION/DECISION MAKING" the contents of which are incorporated by reference in their entirety. This application bears reference to U.S. application Ser. No. 14/801,326 filed 16 Jul. 2015 entitled "SYSTEM AND METHOD FOR CONTEXTUAL SERVICE DELIVERY VIA MOBILE COMMUNICATION DEVICES", to U.S. application Ser. No. 14/801,385 filed on 16 Jul. 2015, entitled "HYBRID SYSTEM AND METHOD FOR DATA AND FILE CONVERSION ACROSS COMPUTING DEVICES AND PLATFORMS" and to U.S. application Ser. No. 18/801,446 entitled "UNIVERSAL SECURE IMAGING WORKFLOW" the contents of which are incorporated by reference in their entirety.

BACKGROUND

Field

This application relates to platforms for collecting, normalizing, aggregating, and presenting/processing data from and to a wide range of devices, machines and applications in a wired or wireless networked framework.

Related Art

As computerization and networked devices capable of communicating with each other have become all pervasive, this has resulted in a vast amount and number of disparate data sources. Data sources include sensors, devices, mobile devices, machines, applications, etc. Additionally, data sources comprise multiple vendors, varied models of the sensors, devices, mobile devices, machines and applications. Yet additionally, the devices are run by varied/different Operating Systems (OS), protocols etc. Further compounding the problem is a lack of standardization, wherein multiple vendors, models, operating systems, protocols, etc. make it impossible for seamless communication across device models and brands. Current solutions can and have addressed this. Addressing this challenge requires three key steps—1. Data collection, aggregation and normalization, 2. Analysis based on events, conditions, and trends across disparate data sources, and 3. Decision making/Actions to be taken, often as a return path or closed loop back to the machines/sensors and or other devices/applications.

However, today's systems offer sequential steps that are time consuming, wherein by the time a decision is taken, the data/conditions may have changed leading to wrong decisions. Further, solutions available are isolated solutions and tend to be silos of a single context, vendor, device type, machine type, application, etc.

There remains a need for automated, real-time, decision making, based on an analysis of conditions across multiple sources. There remains a further need in such an analysis for a correlation capability across the multiple sources. There also remains an additional need to perform such analysis, correlation, and decision making, in real-time, in an automated fashion. Embodiments disclosed address the above challenges.

SUMMARY

Embodiments disclosed include a platform for collecting, normalizing, aggregating, and presenting/processing data over a wide range of devices, machines and applications in real-time, in a wired or wireless networked framework.

A system of one or more computers can be configured to perform particular operations or actions by virtue of having software, firmware, hardware, or a combination of them installed on the system that in operation causes the system to perform the actions. One or more computer programs can be configured to perform particular operations or actions by virtue of including instructions that, when executed by data processing apparatus, cause the apparatus to perform the actions. One general aspect includes a processing unit; a memory element coupled to the processing unit; a means for communicating over a network; encoded instructions stored in the memory element, which when implemented by the processing unit, configure the computer automated system to: in real time, aggregate data from a plurality of data sources connected to the network; normalize the data aggregated from the plurality of data sources. The processing unit is configured to analyze the aggregated, normalized data based on a correlated event or events, a correlated condition or conditions, and a correlated trend or trends across the plurality of data sources. The processing unit also determines a user need based on the analyzed aggregated, normalized data. The user need includes a need for an item or items including at least one of a service, a product, and an upgrade of hardware or software components. The processing unit also determines a provider from a plurality of providers based on the determined user need. The processing unit also includes manually or automatically initiating a need fulfillment transaction between the user and the provider. Other embodiments of this aspect include corresponding computer systems, apparatus, and computer programs recorded on one or more computer storage devices, each configured to perform the actions of the methods.

One general aspect includes in a computer automated system including a processing unit, a memory element coupled to the processing unit, communicating facility over a network, and encoded instructions, a method including: in real time, aggregating data from a plurality of data sources connected to the network; normalizing the data aggregated from the plurality of data sources. The computer automated method also includes analyzing the aggregated, normalized data based on a correlated event or events, a correlated condition or conditions, and a correlated trend or trends across the plurality of data sources. The computer automated method includes determining a user need based on the analyzed aggregated, normalized data. The user need includes a need for an item or items including at least one of a service, a product, and an upgrade of hardware or software components. The computer automated system also includes determining a provider from a plurality of providers based on the determined user need. The computer automated system also includes manually or automatically initiating a need fulfillment transaction between the user and the provider. Other embodiments of this aspect include corresponding computer systems, apparatus, and computer programs recorded on one or more computer storage devices, each configured to perform the actions of the methods.

One general aspect includes a mobile wireless communication device including: a processing unit; a memory element coupled to the processing unit; encoded instructions that configure the mobile device to, in real-time: aggregate data from a plurality of data sources, where the said plurality of data sources include a single or plurality of proxy devices, legacy protocols, devices, applications, machines, sensors, things across locations and user types, or device clouds among devices and applications; normalize data from the said plurality of data sources; analyze the aggregated, normalized data based on a correlated event or events, a correlated condition or conditions, and a correlated trend or trends across the plurality of data sources; and based on the analyzed data, combine the aggregated and normalized data, and display the combined data in a display compatible format. The mobile wireless communication device also includes determining a user need based on the analyzed aggregated, normalized data. The user need includes a need for an item or items including at least one of a service, a product, and an upgrade of hardware or software components. The mobile wireless communication device also includes determining a provider from a plurality of providers based on the determined user need. The mobile wireless communication device also includes initiating a need fulfillment transaction between the user and the provider. Other embodiments of this aspect include corresponding computer systems, apparatus, and computer programs recorded on one or more computer storage devices, each configured to perform the actions of the methods.

DETAILED DESCRIPTION

Figure 1:
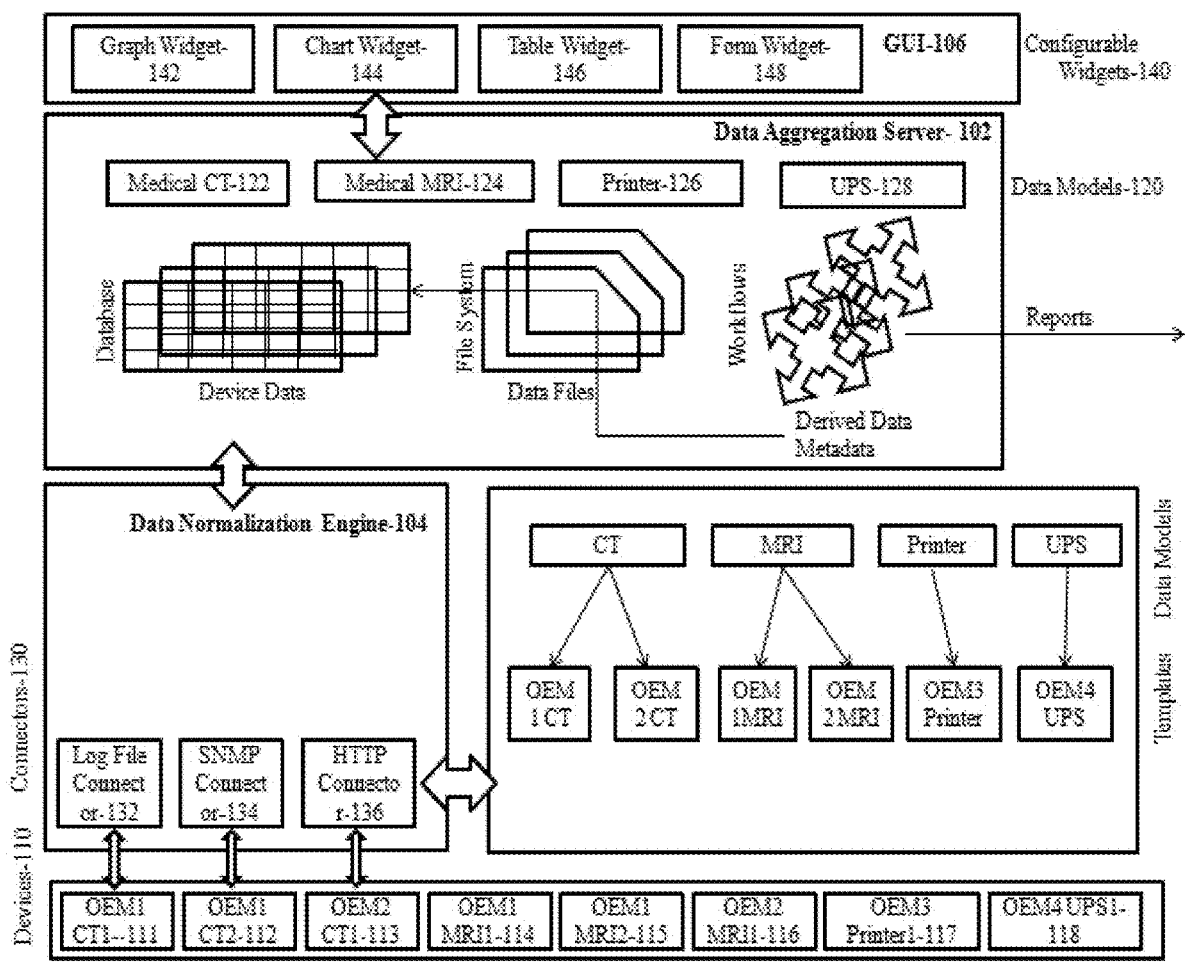
FIG. 1 illustrates the computer system according to an embodiment.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. In other instances, well-known features have not been described in detail to avoid obscuring the invention.

Embodiments disclosed include a platform for collecting, normalizing, aggregating, and presenting/processing data over a wide range of devices and applications.

An embodiment includes a computer automated system comprising a processing unit, a memory element coupled to the processing unit, and a means or capability for communicating over a network. FIG. 1 illustrates the computer system according to an embodiment. The computer automated system includes a data aggregation server 102, a data normalization engine 104, and a presentation platform comprising a graphical user interface 106. In the computer system the data aggregation server is configured to aggregate data from a plurality of devices 110 and applications, such as Medical CT scanners 122, Medical MRI machines, 124, Printers 126, Universal Power Supply (UPS) devices, 128, etc. The data normalization engine 104 is configured to normalize data from the said plurality of devices and applications. And the presentation platform is configured to combine the aggregated and normalized data, and display the combined data in a display compatible format.

According to an embodiment the computer system is further configured to abstract a plurality of classes of devices. This abstracting is done via a data modeling language comprised in the configuration of the computer system. The plurality of classes of devices can include medical CT scanners, medical MRI systems, printers, and UPS stations. The data-modeling language is used to create an abstract data-model for a device-class (e.g. Medical CT scanners, Medical MRI systems, Printers, UPS stations, etc.). The data-model contains a list of device-class parameters, their types, whether (say) read-only or read/write, and synchronous or asynchronous access and propagation, among other things. According to an embodiment, a template (or templates) is/are created to access data-model parameters for a particular device model. The template contains a mapping from the data-model parameters to one or more connectors, specifying the connector name, address/index within the connector space, and processing instructions to read/write each parameter in the data-model for the particular device model. Connectors for each data-access method such as a network protocol (e.g. SNMP connector 134, HTTP connector 136), or/and Log File connector 132, which can read/write device parameters based on information in the template for a particular device model can be used. Parameters for each device under management are either polled periodically or on-demand. In addition to periodic or on-demand polling, data can be collected from data sources, asynchronously.

Device data is collected using several methods. According to an embodiment, an embedded data collection stack resides on the device. The data collections stack interfaces directly with the device using the device application programming interface. In an alternate embodiment, the embedded data collection stack resides in a network gateway device. Here the data collections stack interfaces with the concerned device over the local area network using a network protocol supported by the concerned device. In some embodiments, the gateway device may be pre-loaded with the stack by the manufacturer, and proxy software that resides on and configures a computer in the IP network of the device. In yet another alternate embodiment, the data collection stack can be installed on a computer in the network by the network owner. Alternatively and additionally, it can be installed on an appliance that is inserted into the network. In the network is also a device cloud that can aggregate data for a single or plurality of types of devices, and devices. Data is collected from the device cloud database using the TCP/IP protocol or any other compatible equivalent protocol. An embodiment comprises a mobile application, or part of a mobile application that resides on and configures a mobile device, such that the data collection stack is activated when the mobile application executes. In some instances, the application can be a background process on the mobile device that runs continuously.

In the computer system, the data normalization engine further comprises a plurality of extensible connectors (such as Log File Connector 132, SNMP Connector 134, HTTP connector 136), which are used to extract at least one of log file data, SNMP data and HTTP data from each of a plurality of connected devices. Shown in FIG. 1 are devices 110, which include CT1 111, CT2 112, CT1 113, MRI1 114, MRI2 115, MRI1 116, Printer1 117, and UPS1 118. Further the system is accordingly configured to map data-model parameters to variables in device models via a previously created plurality of templates. The said plurality of extensible connectors is further configured to extract the data model parameters mapped to the said variables in the said device models. Additionally, each device parameter is stored as a name value pair in a no-schema database.

According to an embodiment the computer automated system can be configured to canonical-ize all normalized and aggregated data. This canonicalization includes simplifying the data by adding Meta data and derived data to device data via a set of workflows. In some embodiments, for example when aggregating data from sources not routed through the Connectors and Normalization path, the workflows also normalize the data, if needed, before canonicalization. Further, via a plurality of re-configurable widgets 140, which can include Graph Widget 142, Chart Widget 144, Table Widget 146, Form Widget 148, etc. and via a data modeling language, the system can display device data in a plurality of different forms wherein the said plurality of different forms comprises at least one of a graph, a chart, and a table. Preferably, the said graph, chart and table are configured to show data relevant to each Device Class.

Presentation across platforms/devices—once the data is aggregated and normalized, it is stored in a schema-less data store. This allows any type of data as 'name-value' pairs, indexed by a unique identifier for each device. Access to this data is provided by web services, which are platform independent and can be consumed by any client application on any platform or device.

Abstraction of a plurality of classes of devices using a data modelling language—A data modelling language is used to capture all relevant information about a device class. This abstract data model represents a device class in general. All concrete manifestations of the device class (different models from different manufacturers) can be mapped onto the data model of the device class.

The data model representation itself is not specific to a device class. It is a general representation that can be used for any device class. It contains the names of the parameters of a device class, their value types, the unique device identifier, variables that can be used to identify the devices of that class, the protocols it responds to for the different variables both synchronous and asynchronous, and the frequency of polling for different variables.

Figure 2:
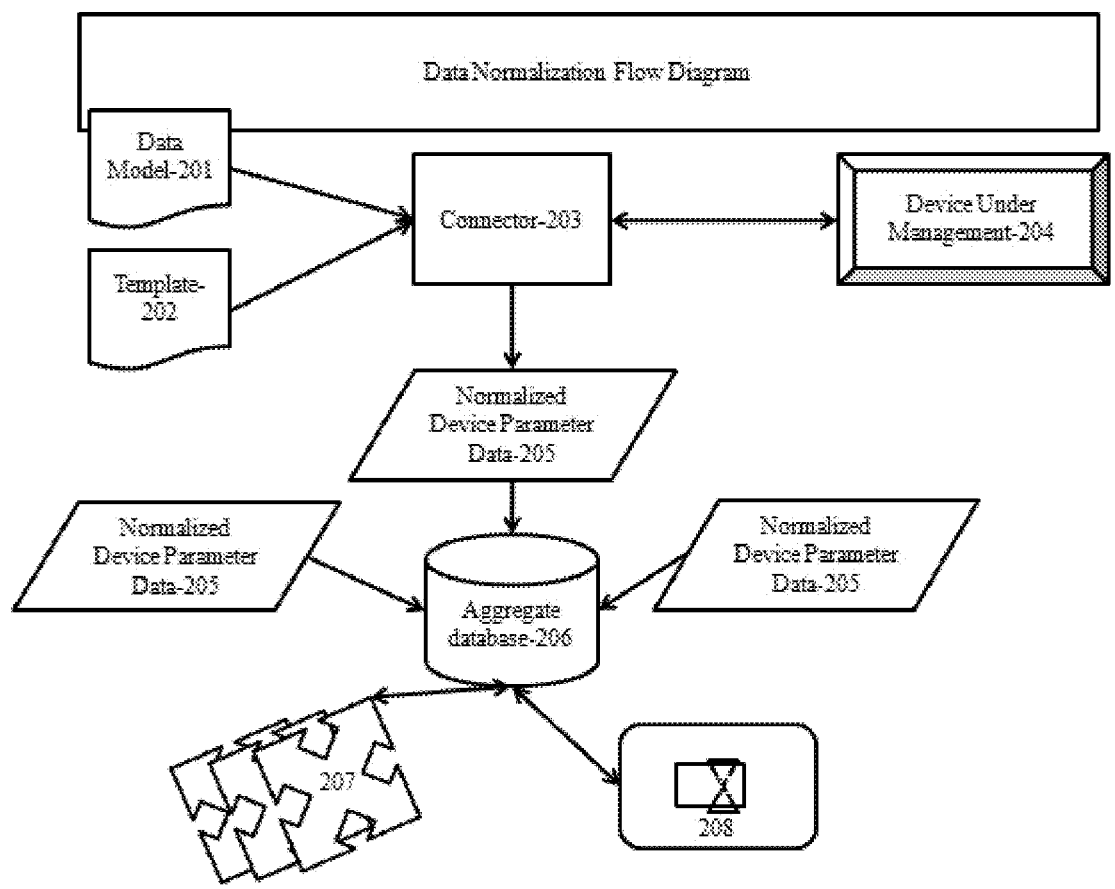
FIG. 2 illustrates data normalization work flow according to an embodiment.

FIG. 2 illustrates data normalization according to an embodiment. Data model 201 comprises data-modeling language instrumental in creating an abstract data-model for a device-class (e.g. Medical CT, Medical MRI, Printers, and UPS etc.). The data-model contains a list of device-class parameters, their types, whether read-only or read/write, and synchronous or asynchronous access and propagation, among other things.

Template 202 is created to access data-model parameters for a particular device model. The template contains a mapping from the data-model parameters to one or more connectors, specifying the connector name, address/index within the connector space, and processing instructions to read/write each parameter in the data-model for the particular device model.

Connectors 203 are available for each data-access method such as a network protocol (e.g. SNMP, HTTP), which can read/write device parameters based on information in the template for a particular device model.

Parameters for each device under management 204 are either polled periodically or on-demand. In addition to periodic or on-demand polling, data can be collected from data sources, asynchronously.

The abstract data-model now contains <name, value> tuples for each instance of a device belonging to device-class. These tuples (names) are necessarily normalized 205 for all devices belonging to a device-class, based on the definition of the data-model for the device-class.

The normalized data for all devices in a device-class, and across device-classes, is now aggregated into a schema-less data-base 206 to be stored as <name, value> tuples.

The normalized data stored in the data-base 206 is processed by a set of device-model independent, but device-class specific, workflows 207 to add metadata and derived data to the extracted device parameter data.

A set of configurable widgets 208 to display device-data and associated meta-data/derived-data in different forms (graphs, charts, tables etc.) complete the canonical viewing of the data.

An embodiment includes a computer implemented method comprising aggregating data from a plurality of devices and applications in a data aggregation server capable of communicating and aggregating the said data over a wired or wireless network. The method further includes, in a data normalization engine, normalizing data from a plurality of devices and applications. And additionally, combining the aggregated and normalized data, and displaying the combined data in a display compatible format through a presentation platform comprising a graphical user interface.

The method further includes abstracting a plurality of classes of devices via a data modeling language. The said abstracting comprises abstracting at least one of medical CT scanners, medical MRI machines, printers, and UPS stations.

Figure 3:
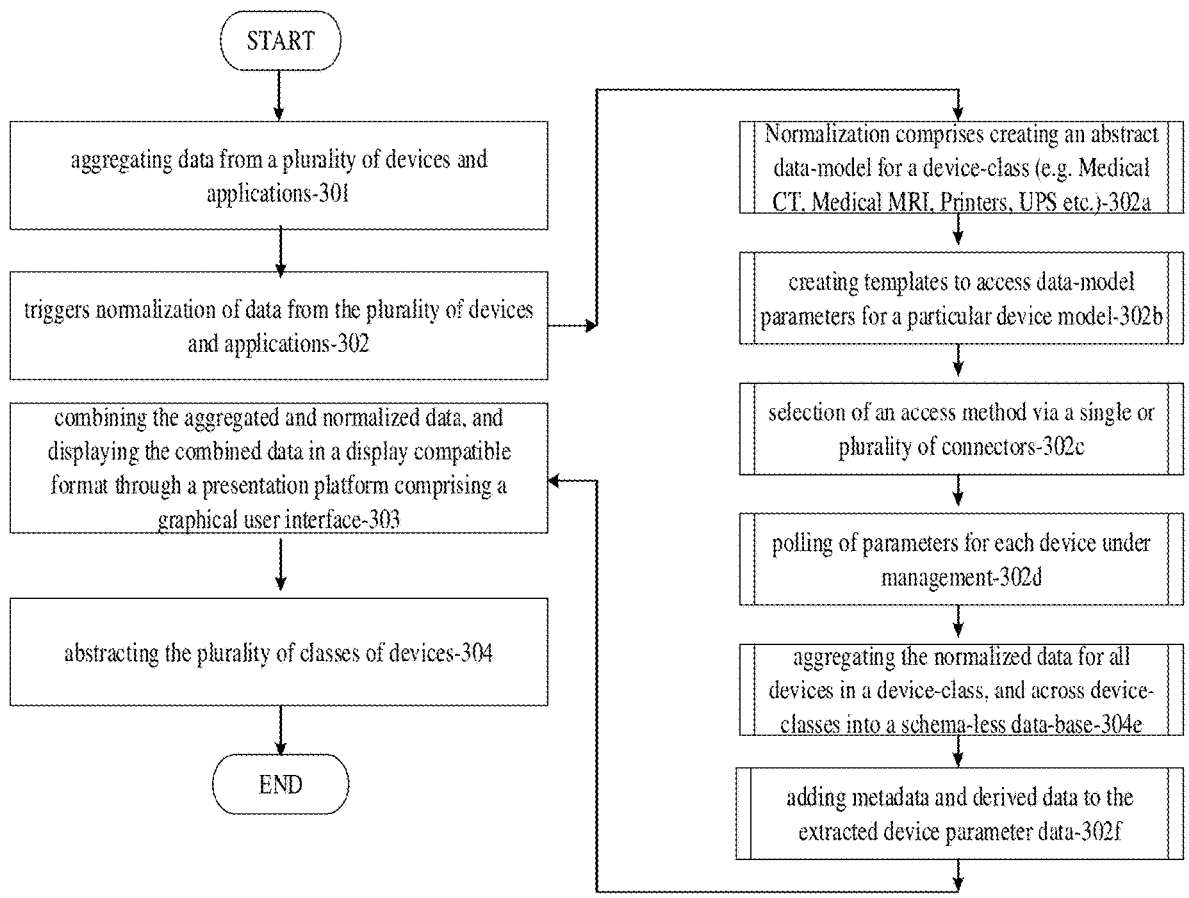
FIG. 3 illustrates the work flow according to an embodiment.

FIG. 3 illustrates the work flow according to an embodiment. Step 301 includes aggregating data from a plurality of devices and applications. Step 302 triggers normalization of data from the plurality of devices and applications. Normalization comprises generating an abstract data-model for a device-class (e.g. Medical CT, Medical MRI, Printers, UPS etc.), as shown in step 302*a*. Step 302*b* comprises generating templates to access data-model parameters for a particular device model. Step 302*c* comprises selection of an access method via a single or plurality of connectors. Step 302*d* includes polling of parameters for each device under management. Step 302*e* includes aggregating the normalized data for all devices in a device-class, and across device-classes into a schema-less data-base. Step 302*f* includes adding metadata and derived data to the extracted device parameter data. Step 303 includes combining the aggregated and normalized data, and displaying the combined data in a display compatible format through a presentation platform comprising a graphical user interface. Step 304 includes abstracting the plurality of classes of devices. Step 305 includes a self-learning step. Based on collected normalized data from devices, applications and users, the computer system is caused to heuristically form associations of users to devices that they use, and thus create clusters or groups. With location data, geo location capability could map these groups to be homes, offices, schools, factories etc. Step 306 enhances the heuristic machine learning capability with predictive analytics. Analytics of collected normalized data from devices, applications and users leads to detection/identification and prediction of needs of users and their devices. Examples of needs could be service, supplies replenishment, upgrade/diagnostics of software, etc. These predictions can be arrived at either by prior thresholds being met or via machine learning. Embodiments disclosed include manual and automated computer systems. Manual systems include an extra layer, step 307 wherein designation of administrator(s) devices enables addressing needs identified in 306. This can also be automated via nomination or/and designation via an application user interface during registration process for larger number of users within a group.

Step 308a includes matching identified needs of users with providers over the network. Based on the needs determined in 306, the computer system triggers a search over the network, and based on the returned results, a selection of matching of providers of the need(s) based on category of need/preference/geography/capability of provider, context, etc.

Step 308b includes automating the transaction process and preferably with contextual offers in a transaction. Based on the needs determined in 306, contextual commercial offers from selected provider(s) are obtained and presented to administrators designated as per 307-308b. Alternatively, a user preference is referenced to automate a contextual transaction.

Step 308c includes completing a contextual transaction. Based on the offers presented in 308b, the administrator accepts an offer through associated workflows of the provider and the contextual need is met. Alternatively the transaction is automated based on a pre-configured user preference.

In an embodiment, the said normalizing of data includes extracting at least one of a log file data, an SNMP data and HTTP data from each of a plurality of connected devices via a plurality of extensible connectors. The method further includes mapping data-model parameters to variables in device models via a plurality of pre-created templates. And extracting the data model parameters mapped to the said variables in the said device models via the said plurality of extensible connectors.

Figure 4:
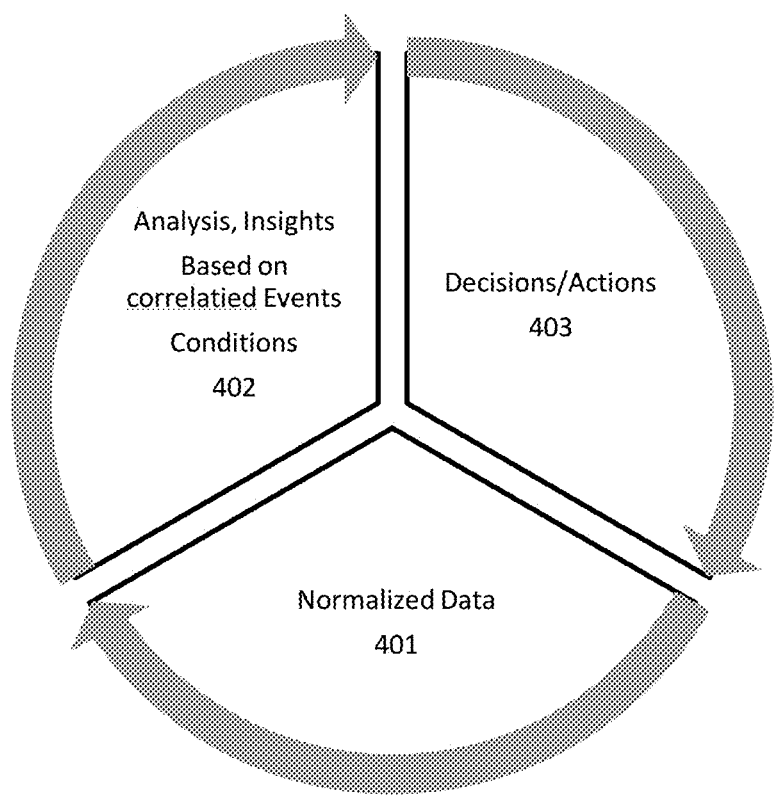
FIG. 4 is a simplified illustration of an embodiment.

FIG. 4 is a simplified illustration of an embodiment. Preferably the system and method are configured to loop through a return path in three steps or stages: Normalization of data→Analysis and insights→Decision/Action in real time.

The normalization 401 entails data collection and normalization across a vast and disparate amount of data sources. Normalization includes normalization across proxy devices, legacy protocols, devices, machines, and sensors, things across locations and user types, and device clouds among others.

According to an embodiment, if the data is coming through an associated or recognized proxy, the data is normalized at the collection point or at an edge. According to an alternate embodiment, if the data is coming through $3^{rd}$ party sources or channels then normalization is implemented at an associated server. Additionally, there could be instances of the data coming through different sources as well—e.g. Mobile, the associated proxy, through web services etc. In such instances, post processing and normalization is done at the associated server. Variations, modifications, permutations, and combinations are possible, as would be apparent to a person having ordinary skill in the art.

The Analysis 402 is based on a correlated event or events, a correlated condition or conditions, and a correlated trend or trends across these disparate sources of data, analyzed via Device Internet of Things (JOT) stacks and gateways.

This is followed by Decisions/Actions 403 as a return path or closed loop back to the machines/sensors and or other devices/applications. Decisions are taken in real-time based on information obtained from data sources, like the web, social media, etc. and communication devices, in real-time.

Prior art systems offer sequential steps and the time taken to go through these steps are very slow and by the time a decision is taken, the data/conditions may have changed leading to wrong decisions. Also, those that offer such solutions tend to be silos of a single context or vendor or type of device. The decision making is based on analysis of conditions across multiple sources that need to be correlated and done in real-time. Embodiments disclosed enable this correlation and further enable automation of the disclosed systems and methods such that preferred embodiments are configured to react in real-time, depending upon prevailing conditions.

Since various possible embodiments might be made of the above invention, and since various changes might be made in the embodiments above set forth, it is to be understood that all matter herein described or shown in the accompanying drawings is to be interpreted as illustrative and not to be considered in a limiting sense. Thus it will be understood by those skilled in the art that although the preferred and alternate embodiments have been shown and described in accordance with the Patent Statutes, the invention is not limited thereto or thereby.

Embodiments disclosed enable seamless communication across device and machine models, applications, brands, operating systems, networks, and protocols. Embodiments disclosed further enable real-time data collection and normalization, real-time analysis based on events, conditions, and trends across disparate data sources, and real-time decision making/action as a return path or closed loop back to the machines/sensors and or other devices/applications. Embodiments disclosed also enable the return path or the control path for configuration, control and diagnostics. Preferred embodiments include a correlation capability across the multiple sources in real-time analysis and decision making. Embodiments disclosed also enable working across multiple silos.

The figures illustrate the architecture, functionality, and operation of possible implementations of systems and methods according to various embodiments of the present invention. It should also be noted that, in some alternative implementations, the functions noted/illustrated may occur out of the order noted in the figures. For example, two blocks shown in succession may, in fact, be executed substantially concurrently, or the blocks may sometimes be executed in the reverse order, depending upon the functionality involved.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In general, the steps executed to implement the embodiments of the invention, may be part of an automated or manual embodiment, and programmable to follow a sequence of desirable instructions.

The present invention and some of its advantages have been described in detail for some embodiments. It should be understood that although some example embodiments of the data aggregation, normalization and presentation system and method are described with reference to specific device types and applications, the computer implemented system and method is highly reconfigurable, and embodiments include reconfigurable systems that may be dynamically adapted to be used in other contexts as well. It should also be understood that various changes, substitutions and alterations can be made herein without departing from the spirit and scope of the invention as defined by the appended claims. An embodiment of the invention may achieve multiple objectives, but not every embodiment falling within the scope of the attached claims will achieve every objective. Moreover, the scope of the present application is not intended to be limited to the particular embodiments of the process, machine, manufacture, and composition of matter, means, methods and steps described in the specification. A person having ordinary skill in the art will readily appreciate from the disclosure of the present invention that processes, machines, manufacture, compositions of matter, means, methods, or steps, presently existing or later to be developed are equivalent to, and fall within the scope of, what is claimed. Accordingly, the appended claims are intended to include within their scope such processes, machines, manufacture, compositions of matter, means, methods, or steps.

The invention claimed is:

1. A computer automated system comprising:
   a processing unit;
   a memory element coupled to the processing unit;
   a communications network;
   encoded instructions stored in the memory element, which when implemented by the processing unit, configure the computer automated system to: in real time, aggregate device data via a n embedded data collection stack from a plurality of device classes connected to the network; wherein the aggregation of device data further comprises aggregation of device behavior data, device usage data, and device location data; normalize the device data aggregated from the plurality of device classes; wherein the normalize the device data comprises: generating an abstract device data model for the plurality of device classes; extracting a device data model para meter via the generated abstract device data model;
   polling the extracted device data model parameter extracted via the generated a bstract device data model;
   adding metadata to the extracted device data model parameter;
   add meta-data and derived data to aggregated device data from each of the plurality of device classes;
   analyze the aggregated, normalized device data based on a correlated event or events and a correlated condition or conditions across the plurality of device classes; and
   determine a device behavior based on the analyzed aggregated, normalized data; wherein the determined device behavior comprises determining a need for an item or items comprising at least one of a service, a product, and an upgrade of hardware or software components;
   determine a provider from a plurality of providers based on the determined device behavior; and
   initiate a need fulfillment transaction between the device and the provider.

2. The computer automated system of claim 1 wherein the system is further configured to: heuristically form an association or associations of devices based on at least one of their determined needs, their determined providers and their determined location.

3. The computer automated system of claim 1 wherein the system is further configured to: determine the device need based on a pre-defined threshold being met or via heuristic machine learning.

4. The computer automated system of claim 1 wherein the system is further configured to: fulfill the need fulfillment transaction via a pre-designated administrator.

5. The computer automated system of claim 1 wherein the system is further configured to:
   based on the determined device need, initiate via the network, a search for a single or plurality of providers connected to the network;
   select the single or plurality of providers based on at least one of a category, a preference, a geography, and a context; and
   initiate and complete the need fulfillment transaction between the device and the provider.

6. The computer automated system of claim 1 wherein:
   the said plurality of device classes comprise a single or plurality of proxy devices, legacy protocols, devices, applications, machines, and sensors, across locations; and
   the device usage data comprises at least one of device manufacturer, model name, serial number, settings, status, consumable status, and user details.

7. The computer automated system of claim 1 wherein the system is further configured to: abstract the plurality of device classes, wherein the device classes comprise a plurality of CT scanners, medical MRIs, printers, and UPS systems.

8. The computer automated system of claim 1 wherein normalizing the data aggregated from the plurality of device classes comprises, via a plurality of extensible connectors:
   extracting at least one of log file data, SNMP data and HTTP data from each of the plurality of connected devices; and
   extracting data model parameters mapped to variables in device models.

9. The computer automated system of claim 1 wherein the system is configured to:
   display device data as at least one of a graph, a chart, and a table wherein the said graph, chart and table are configured to show data relevant to each data source class.

10. The system of claim 1 wherein computer system is further configured to:
    analyze the aggregated, normalized device data via a single or plurality of Device Internet of Things (TOT) stacks and gateways;
    based on the analysis, implement a single or plurality of decisions, in real-time, in a return path, on a single or plurality of machines, sensors, devices or applications; and
    implementing the single or plurality of decisions in the return path or closed loop comprises contextual real-time matching between a device class with a single or plurality of providers according to the determined device need.

11. In a computer automated system comprising a processing unit, a memory element coupled to the processing unit, communicating facility over a network, and encoded instructions, a method comprising:
    in real time, aggregating device data via an embedded data stack from a plurality of device classes connected to the network;
    wherein aggregating device data further comprises aggregating device behavior data, device usage data, and device location data;

normalizing the device data aggregated from the plurality of device classes;
  wherein normalizing the device data comprises:
    generating an abstract device data model for the plurality of device classes;
    extracting a device data model parameter via the generated abstract device data model;
    polling the extracted device data model parameter extracted via the generated abstract device data model;
    adding metadata to the extracted device data model parameter;
  adding meta-data and derived data to aggregated device data from each of the plurality of device classes;
  analyzing the aggregated, normalized device data based on a correlated event or events and a correlated condition or conditions across the plurality of device classes; and
  determining a device behavior based on the analyzed aggregated, normalized device data; wherein the determined device behavior comprises determining a need for an item or items comprising at least one of a service, a product, and an upgrade of hardware or software components;
  determining a provider from a plurality of providers based on the determined device behavior; and
  initiating a need fulfillment transaction between the device and the provider.

12. The method of claim 11 further comprising:
heuristically forming an association or associations of devices and at least one of their determined needs, their determined providers and their determined location.

13. The method of claim 11 further comprising:
determining the device need based on a pre-defined threshold being met or via heuristic machine learning.

14. The method of claim 11 further comprising:
fulfilling the need fulfillment transaction via a pre-designated administrator.

15. The method of claim 11 further comprising:
based on the determined device need, initiating via the network, a search for a single or plurality of providers connected to the network;
selecting the single or plurality of providers based on at least one of a category, a preference, a geography, and a context; and
initiating and completing the need fulfillment transaction between the device and the provider.

16. The method of claim 11 wherein:
the said plurality of device classes comprise a single or plurality of proxy devices, legacy protocols, devices, applications, machines, and sensors, across locations; and
the device usage data comprises at least one of device manufacturer, model name, serial number, settings, status, consumable status, and user details.

17. The method of claim 11 further comprising:
abstracting the plurality of device classes, wherein the plurality of device classes comprise a plurality of CT scanners, medical MRIs, printers, and UPS systems.

18. The method of claim 11 wherein normalizing the data aggregated from the plurality of device classes comprises, via a plurality of extensible connectors:
  extracting at least one of log file data, SNMP data and HTTP data from each of the plurality of connected devices; and
  extracting data model parameters mapped to variables in device models.

19. The method of claim 11 further comprising:
displaying device data as at least one of a graph, a chart, and a table wherein the said graph, chart and table are configured to display data relevant to each data source class.

20. The method of claim 11 further comprising:
analyzing the aggregated, normalized device data via a single or plurality of Device Internet of Things (IOT) stacks and gateways;
based on the analysis, implementing a single or plurality of decisions, in real-time, in a return path, on a single or plurality of machines, sensors, devices or applications; and
wherein implementing the single or plurality of decisions in the return path comprises contextual real-time matching between a device class with a single or plurality of providers according to the determined device need.

21. In a computer automated system comprising a processing unit coupled to a memory element and having instructions encoded thereon, a method comprising, in real-time:
  aggregating device data via an embedded data collection stack from a plurality of device classes, wherein the said plurality of device classes comprise a single or plurality of proxy devices, legacy protocols, devices, applications, machines, and sensors, across locations;
  normalizing said device data from the plurality of device classes, wherein the normalizing comprises:
    generating an abstract device data model for the plurality of device classes;
    extracting device data model parameters via the generated abstract device data model;
    polling the extracted device data model parameters for each device class type;
    adding metadata and derived data to the extracted device data model parameter;
  analyzing the aggregated and normalized device data based on a correlated event or events, and a correlated condition or conditions across the plurality of device classes; and
  based on the said analyzing:
    implementing a single or plurality of decisions, in real-time, in a return path, on a single or plurality of machines, sensors, devices or applications;
    wherein the said implementing comprises initiating a need fulfillment transaction between the device and a provider device; and
    combining the aggregated and normalized device data, and displaying the combined device data in a display compatible format.

22. The method of claim 21 wherein:
the aggregating the device data further comprises aggregating device behavior data, device usage data, device location data;
wherein the device usage data comprises at least one of device manufacturer, model name, serial number, settings, status, consumable status, and user details; and
wherein the said analyzing the aggregated, normalized device data further comprises determining a need for an item or items wherein the said item or items comprise at least one of a service, replacement, and an upgrade of hardware or software components.

23. A mobile wireless communication device comprising:
a processing unit;
a memory element coupled to the processing unit;
encoded instructions that configure the mobile device to, in real-time:
  aggregate device data via an embedded data collection stack from a plurality of device classes, wherein the said plurality of device classes comprise a single or plurality of proxy devices, legacy protocols, devices, applications, machines, and sensors, across locations;
  normalize device data from the said plurality of device classes;
    wherein the normalize the device data comprises:
      generating an abstract device data model for the plurality of device classes;
      extracting a device data model parameter via the generated abstract device data model;
      polling the extracted device data model parameter extracted via the generated abstract device data model;
      adding metadata to the extracted device data model parameter;
  add meta-data and derived data to aggregated device data from each of the plurality of device classes;
  analyze the aggregated, normalized device data based on a correlated event or events, and a correlated condition or conditions, across the plurality of device classes; and
  based on the analyzed device data, combine the aggregated and normalized device data, and display the combined device data in a display compatible format;
  determine a device behavior based on the analyzed aggregated, normalized device data;
  wherein the determined device behavior comprises determining a need for an item or items comprising at least one of a service, a product, and an upgrade of hardware or software components;
  determine a provider from a plurality of providers based on the determined device need; and
  initiate a need fulfillment transaction between the device and the provider.

24. The mobile wireless communication device of claim 23 wherein:
  the aggregation of device data further comprises aggregation of device behavior data, device usage data, and device location data; and
  wherein the device usage data comprises at least one of device manufacturer, model name, serial number, settings, status, consumable status, and user details.

25. The mobile wireless communication device of claim 23 wherein the device is further configured to:
  based on the analyzed device data, trigger a single or plurality of decisions or actions, in real-time, in a return path, on a single or plurality of machines, sensors, devices or applications.

* * * * *